US010189717B2

United States Patent
Zones

(10) Patent No.: US 10,189,717 B2
(45) Date of Patent: Jan. 29, 2019

(54) SYNTHESIS OF ALUMINOSILICATE ZEOLITE SSZ-26 VIA INTERZEOLITE TRANSFORMATION

(71) Applicant: Chevron U.S.A. Inc., San Ramon, CA (US)

(72) Inventor: Stacey Ian Zones, San Francisco, CA (US)

(*) Notice: Subject to any disclaimer, the term of this patent is extended or adjusted under 35 U.S.C. 154(b) by 0 days.

(21) Appl. No.: 15/690,422

(22) Filed: Aug. 30, 2017

(65) Prior Publication Data

US 2018/0057365 A1    Mar. 1, 2018

Related U.S. Application Data

(60) Provisional application No. 62/382,298, filed on Sep. 1, 2016.

(51) Int. Cl.
*C01B 39/48* (2006.01)
*B01J 29/70* (2006.01)
*C01B 39/02* (2006.01)

(52) U.S. Cl.
CPC .............. *C01B 39/48* (2013.01); *B01J 29/70* (2013.01); *C01B 39/026* (2013.01); *C01P 2002/72* (2013.01)

(58) Field of Classification Search
CPC ........ C01B 39/48; C01B 39/026; B01J 29/72; B01J 29/70
See application file for complete search history.

(56) References Cited

U.S. PATENT DOCUMENTS

| 4,910,006 | A |  | 3/1990 | Zones et al. |
| 5,007,997 | A |  | 4/1991 | Zones et al. |
| 7,648,694 | B2 |  | 1/2010 | Burton, Jr. |
| 7,837,978 | B2 |  | 11/2010 | Burton, Jr. |
| 8,198,501 | B2 | * | 6/2012 | Chen ........................ B01J 21/18 |
|  |  |  |  | 585/739 |

OTHER PUBLICATIONS

Shim et al, "Chabazite: Eneergetics of hydration, enthalpy of formation, and effect of cations on stability", American Mineralogist, vol. 84, pp. 1870-1882, (1999) (Year: 1999).*
Corma et al, "An Study of Cyclohexylpyrrolidine-Derived Quaternary Organic Cations As the Structure Directing Agent for Synthesis of Zeolites", Studies in Surface Science and Catalysis, vol. 154, pp. 265-274 (2004) (Year: 2004).*
S.I. Zones, M.M. Olmstead and D.S. Santilli "Guest/Host Relationships in the Synthesis of Large Pore Zeolite SSZ-26 from a Propellane Quaternary Ammonium Compound" J. Am. Chem. Soc. 1992, 114, 4195-4201.

* cited by examiner

*Primary Examiner* — David M Brunsman
(74) *Attorney, Agent, or Firm* — Terrence M. Flaherty

(57) ABSTRACT

A method is provided for synthesizing aluminosilicate zeolite SSZ-26 by interzeolite transformation.

9 Claims, 1 Drawing Sheet

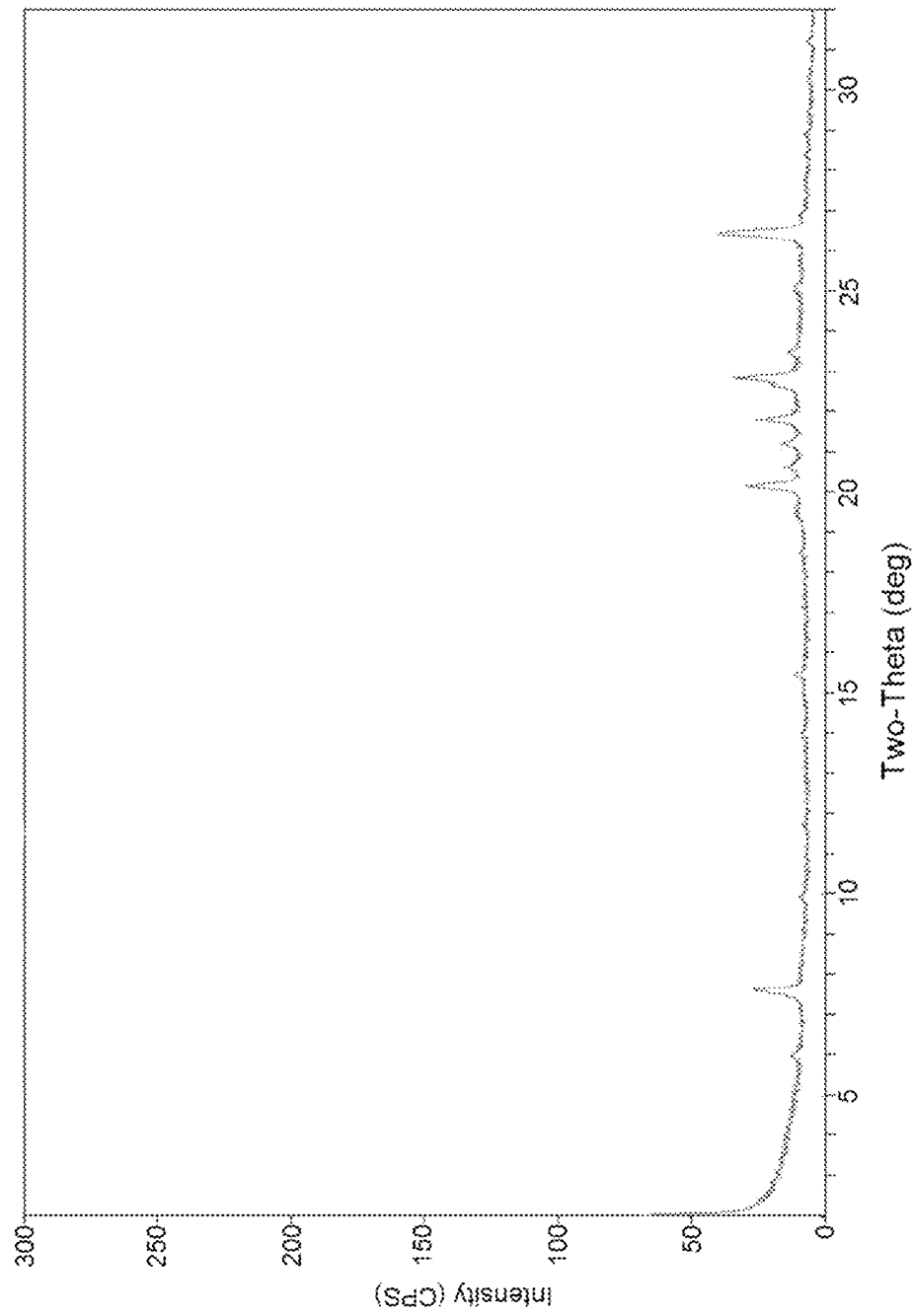

US 10,189,717 B2

SYNTHESIS OF ALUMINOSILICATE ZEOLITE SSZ-26 VIA INTERZEOLITE TRANSFORMATION

CROSS-REFERENCE TO RELATED APPLICATIONS

This application claims priority to U.S. Provisional Application Ser. No. 62/382,298, filed on Sep. 1, 2016, the disclosure of which is fully incorporated herein by reference.

TECHNICAL FIELD

This disclosure is directed to the synthesis of zeolite SSZ-26.

BACKGROUND

Zeolites SSZ-26 and SSZ-33 belong to a family of zeolites with three-dimensional intersecting 10- and 12-membered ring channels. These two zeolites can be characterized as members of a family of materials in which the two end-members are formed by the stacking of layers in an ABAB sequence ("polymorph A") or an ABCABC sequence ("polymorph B"). The framework formed by polymorph A is of orthorhombic symmetry while the framework formed by polymorph B is of monoclinic symmetry. In between these end-member polymorphs, there is a whole family of materials that can be characterized by a fault probability (p) of 0%<p<100% (referred to herein as "SSZ-26/33 family"). Fault probabilities of 0% and 100% represent the end-members polymorph B and polymorph A, respectively. The aluminosilicate SSZ-26 and the borosilicate SSZ-33 are members of this family of materials and have fault probabilities of approximately 15% and 30%, respectively. Zeolite CIT-1 (CON) corresponds to a pure or nearly pure polymorph B.

U.S. Pat. No. 4,910,006 discloses zeolite SSZ-26 and its synthesis using hexamethyl[4.3.3.0]propellane-8,11-diammonium cations as a structure directing agent.

U.S. Pat. No. 7,648,694 discloses the synthesis of zeolites belonging to the SSZ-26/SSZ-33 family of zeolites using a structure directing agent selected from 1,4-bis(N-cyclohexylpyrrolidinium)butane dications, 1,5-bis(N-cyclohexylpyrrolidinium)pentane dications, 1,5-bis(N,N-dimethylcyclohexylammonium)pentane dications, 1,4-bis(N-cyclohexylpiperidinium)butane dications, and 1,4-bis(N-cyclopentylpiperidinium)butane dications.

U.S. Pat. No. 7,837,978 discloses the direct synthesis of aluminum-containing SSZ-26 using a structure directing agent comprising cis-N,N-diethyldecahydroquinolinium cations or a mixture of cis-N,N-diethyldecahydroquinolinium cations and trans-N,N-diethyldecahydroquinolinium cations.

The commercial development of SSZ-26 has been hindered by the high cost of these structure directing agents and hence there has been significant interest in finding alternative, less expensive means for the synthesis of SSZ-26.

Accordingly, there is provided herein a more facile and cost effective method for synthesizing SSZ-26 via interzeolite conversion of FAU framework type zeolites which can significantly reduce the amount of structure directing agent used.

SUMMARY

In one aspect, there is provided a method of synthesizing aluminosilicate zeolite SSZ-26 by: (a) preparing a reaction mixture comprising: (1) a FAU framework type zeolite; (2) a source of Group 1 or Group 2 metal; (3) hydroxide ions; (4) a structure directing agent comprising 1,4-bis(N-cyclohexylpyrrolidinium)butane dications; and (5) water; and (b) subjecting the reaction mixture to crystallization condition sufficient to form crystals of aluminosilicate zeolite SSZ-26.

BRIEF DESCRIPTION OF THE DRAWINGS

FIG. 1 is a powder X-ray diffraction (XRD) pattern of the as-synthesized zeolite prepared in Example 1.

DETAILED DESCRIPTION

Introduction

The term "framework type" is used in the sense described in the "*Atlas of Zeolite Framework Types*," Sixth Revised Edition, Elsevier (2007).

The term "as-synthesized" is employed herein to refer to a zeolite in its form after crystallization, prior to removal of the structure directing agent.

The term "anhydrous" is employed herein to refer to a zeolite substantially devoid of both physically adsorbed and chemically adsorbed water.

The term "substantially free" when used in relation to a specific component of a reaction mixture means that the reaction mixture can contain less than 0.5 wt. % (e.g., less than 0.1 wt. %, less than 0.05 wt. %, less than 0.01 wt. %, or no measurable quantity) of that component.

As used herein, the numbering scheme for the Periodic Table Groups is as disclosed in *Chem. Eng. News* 1985, 63(5), 26-27.

Reaction Mixture

In general, aluminosilicate zeolite SSZ-26 can be synthesized by: (a) preparing a reaction mixture comprising (1) a FAU framework type zeolite; (2) a source of Group 1 or Group 2 metal (M); (3) hydroxide ions; (4) a structure directing agent (Q) comprising 1,4-bis(N-cyclohexylpyrrolidinium)butane dications; and (5) water; and (b) subjecting the reaction mixture to crystallization condition sufficient to form crystals of aluminosilicate zeolite SSZ-26.

The composition of the reaction mixture from which SSZ-26 is formed, in terms of mole ratios, is identified in Table 1 below:

TABLE 1

| Reactants | Useful | Exemplary |
| --- | --- | --- |
| $SiO_2/Al_2O_3$ | 30 to 80 | 60 to 80 |
| $M/SiO_2$ | 0.05 to 0.50 | 0.05 to 0.30 |
| $Q/SiO_2$ | <0.05 | 0.001 to 0.045 |
| $OH/SiO_2$ | 0.10 to 1.0 | 0.20 to 0.50 |
| $H_2O/SiO_2$ | 15 to 80 | 20 to 60 | wherein Q and M are as described herein above.

Suitable FAU framework type zeolites are available commercially from Zeolyst International (Conshohocken, Pa.) and Tosoh Corporation (Tokyo, Japan).

The reaction mixture may be substantially free of a non-zeolitic source of silicon oxide. Examples of non-zeolitic sources of silicon oxide include colloidal silicas, fumed silicas, precipitated silicas, alkali metal silicates, and tetraalkyl orthosilicates.

The reaction mixture may be substantially free of a non-zeolitic source of aluminum oxide. Examples of non-zeolitic sources of aluminum oxide include hydrated alumina, aluminum hydroxide, alkali metal aluminates, aluminum alkoxides, and water-soluble aluminum salts (e.g., aluminum nitrate).

Suitable sources of Group 1 or Group 2 metal (M) cations include metal oxide, metal hydroxide, metal chloride, metal fluoride, metal sulfate, metal nitrate, and metal aluminate. Preferably, the metal cation is a Group 1 metal cation selected from sodium, potassium, and mixtures of sodium and potassium cations. Sodium cation is preferred.

Suitable sources of hydroxide ions include Group 1 or Group 2 metal hydroxides, such as sodium hydroxide. Hydroxide can also be present as a counter-ion of the structure directing agent.

The structure directing agent (Q) comprises 1,4-bis(N-cyclohexylpyrrolidinium)butane dications, represented by the following structure (1):

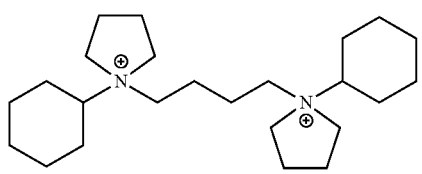

(1)

Suitable sources of Q are the hydroxides, chlorides, bromides, and/or other salts of the diquaternary ammonium compound.

The reaction mixture may contain seeds of a zeolitic material, such as SSZ-26 from a previous synthesis, desirably in an amount of from 0.01 to 10,000 ppm by weight (e.g., from 100 to 5000 ppm by weight) of the reaction mixture. Seeding can be advantageous in decreasing the time necessary for complete crystallization to occur. Seeding can lead to an increased purity of the obtained by promoting the nucleation and/or formation of SSZ-26 over any undesired phases.

For each embodiment described herein, the reaction mixture can be supplied by more than one source. Also, two or more reaction components can be provided by one source.

The reaction mixture can be prepared either batch wise or continuously. Crystal size, morphology and crystallization time of the zeolite herein can vary with the nature of the reaction mixture and the crystallization conditions.

Crystallization and Post-Synthesis Treatment

Crystallization of SSZ-26 from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. (e.g., from 130° C. to 160° C.) for a time sufficient for crystallization to occur at the temperature used (e.g., from 10 to 250 hours or from 15 to 100 hours). The reaction mixture is usually reacted under autogenous pressure, or optionally in the presence of a gas such as nitrogen.

Once the crystals of SSZ-26 have formed, the solid product is separated from the reaction mixture by standard mechanical separation techniques such as centrifugation or filtration. The recovered crystals are water-washed and then dried to obtain the as-synthesized SSZ-26 crystals. The drying step is typically performed at a temperature of less than 200° C.

As a result of the crystallization process, the recovered crystalline SSZ-26 product contains within its pore structure at least a portion of the structure directing agent used in the synthesis.

The as-synthesized zeolite may be subjected to treatment to remove part, or all, of the organic structure directing agent used in its synthesis. This is conveniently effected by thermal treatment (calcination) in which the as-synthesized material is heated at a temperature of at least about 370° C. for at least 1 minute and generally not longer than 20 hours. While sub-atmospheric pressure can be employed for the thermal treatment, atmospheric pressure is desired for reasons of convenience. The thermal treatment can be performed at a temperature up to 925° C. Additionally or alternatively, the structure directing agent may be removed by photolysis techniques as described in U.S. Pat. No. 6,960,327.

The original Group 1 and/or Group 2 metal cations (e.g., $Na^+$) in the as-synthesized material can be replaced in accordance with techniques well known in the art by ion exchange with other cations. Preferred replacing cations include metal ions, hydrogen ions, hydrogen precursor (e.g., ammonium) ions, and combinations thereof. Particularly preferred replacing cations are those which tailor catalytic activity for certain organic compound conversion reactions. These include hydrogen, rare earth metals and metals of Groups 2 to 15 of the Periodic Table.

Characterization of the Molecular Sieve

In its as-synthesized and anhydrous form, aluminosilicate zeolite SSZ-26 prepared by the method described herein has a chemical composition, in terms of molar ratios, as described in Table 2:

TABLE 2

| $SiO_2/Al_2O_3$ | 20 to 80 |
| $Q/SiO_2$ | >0 to 0.1 |
| $M/SiO_2$ | >0 to 0.1 | wherein Q and M are as described herein above.

It should be noted that the as-synthesized form of aluminosilicate SSZ-26 may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 7,648,694, aluminosilicate zeolite SSZ-26 is characterized by an X-ray diffraction pattern which, in the as-synthesized form of the zeolite, includes at least the peaks set forth in Table 3 and which, in the calcined form of the zeolite includes at least the peaks set forth in Table 4.

TABLE 3

Characteristic Peaks for As-Synthesized SSZ-26

| 2-Theta[a] | d-Spacing, nm | Relative Intensity[b] |
|---|---|---|
| 7.77 | 1.137 | VS |
| 20.27 | 0.438 | VS |
| 21.32 | 0.416 | M |
| 21.92 | 0.405 | S |
| 22.76 | 0.390 | S |
| 22.92 | 0.388 | VS |
| 26.53 | 0.336 | M |

[a] ±0.20
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-26

| 2-Theta[a] | d-Spacing, nm | Relative Intensity[b] |
|---|---|---|
| 7.75 | 1.140 | VS |
| 20.21 | 0.439 | M |
| 21.29 | 0.417 | W |
| 21.93 | 0.405 | M |
| 22.87 | 0.389 | M |
| 23.07 | 0.385 | S |
| 26.49 | 0.336 | M |

[a] ±0.20
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks, and $d$, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern.

EXAMPLES

The following illustrative examples are intended to be non-limiting.

Example 1

Synthesis of Aluminosilicate SSZ-26

1N NaOH (3.90 g), deionized water (3.75 g), and 1,4-bis (N-cyclohexylpyrrolidinium)butane dihydroxide (0.5 mmole) were mixed together in a Teflon liner. Seeds (60 mg) of SSZ-26 from a previous synthesis were added to the mixture followed by addition of CBV780 Y zeolite (600 mg, $SiO_2/Al_2O_3$ mole ratio=80). The liner was then capped and placed within a Parr steel autoclave reactor. The autoclave was placed in an oven and heated at 150° C. while rotating at 43 rpm for about 45 hours. The solid products were recovered from the cooled reactor by filtration, washed with deionized water and dried at 95° C.

The resulting product was analyzed by powder XRD. The powder X-ray diffraction pattern is shown in FIG. 1 and indicates that the material is SSZ-26.

The invention claimed is:

1. A method of synthesizing aluminosilicate zeolite SSZ-26, the method comprising:
    (a) preparing a reaction mixture comprising:
        (1) a FAU framework type zeolite;
        (2) a source of Group 1 or Group 2 metal (M);
        (3) hydroxide ions;
        (4) a structure directing agent (Q) comprising 1,4-bis (N-cyclohexylpyrrolidinium)butane dications; and
        (5) water; and
    (b) subjecting the reaction mixture to crystallization conditions sufficient to convert the FAU framework type zeolite to aluminosilicate zeolite SSZ-26,
    wherein the reaction mixture has a composition, in terms of molar ratios, as follows:

| | |
|---|---|
| $SiO_2/Al_2O_3$ | 30 to 80 |
| $M/SiO_2$ | 0.05 to 0.50 |
| $Q/SiO_2$ | <0.05 |
| $OH/SiO_2$ | 0.10 to 1.0 |
| $H_2O/SiO_2$ | 15 to 80. |

2. The method of claim 1, wherein the reaction mixture has a composition, in terms of molar ratios, as follows:

| | |
|---|---|
| $SiO_2/Al_2O_3$ | 60 to 80 |
| $M/SiO_2$ | 0.05 to 0.30 |
| $Q/SiO_2$ | 0.001 to 0.045 |
| $OH/SiO_2$ | 0.20 to 0.50 |
| $H_2O/SiO_2$ | 20 to 60. |

3. The method of claim 1, wherein the reaction mixture also contains seeds.

4. The method of claim 3, wherein the reaction mixture comprises from 0.01 ppm by weight to 10,000 ppm by weight of seeds.

5. The method of claim 3, wherein the reaction mixture comprises from 100 ppm by weight to 5,000 ppm by weight of seeds.

6. The method of claim 3, wherein the seeds comprise a zeolitic material having the structure of the SSZ-26/33 family of zeolites.

7. The method of claim 1, wherein the crystallization conditions include autogenous pressure and a temperature of from 125° C. to 200° C.

8. The method of claim 1, wherein the reaction mixture is substantially free of a non-zeolitic source of silicon oxide.

9. The method of claim 1, wherein the reaction mixture is substantially free of a non-zeolitic source of aluminum oxide.

* * * * *